(12) United States Patent
Sundquist

(10) Patent No.: US 9,298,010 B2
(45) Date of Patent: Mar. 29, 2016

(54) WEARABLE OPTICAL DISPLAY WITH AUDIO FUNCTIONALITY

(71) Applicant: Marissa J. Sundquist, Minneapolis, MN (US)

(72) Inventor: Marissa J. Sundquist, Minneapolis, MN (US)

(*) Notice: Subject to any disclaimer, the term of this patent is extended or adjusted under 35 U.S.C. 154(b) by 0 days.

(21) Appl. No.: 14/705,292

(22) Filed: May 6, 2015

(65) Prior Publication Data

US 2016/0041392 A1 Feb. 11, 2016

Related U.S. Application Data

(60) Provisional application No. 62/034,789, filed on Aug. 8, 2014.

(51) Int. Cl.
*G09G 5/00* (2006.01)
*G02B 27/01* (2006.01)
*H04N 7/18* (2006.01)
*H04N 5/74* (2006.01)

(52) U.S. Cl.
CPC .............. *G02B 27/0172* (2013.01); *H04N 5/74* (2013.01); *H04N 7/18* (2013.01)

(58) Field of Classification Search
CPC .............. G02B 27/01; G02B 27/017–27/0176; G02B 2027/0174; G02B 2027/0178; G06F 3/011–3/013; G06F 3/005; G06F 1/163; H04N 5/7491
USPC ........................ 345/7–9; 359/13, 14, 630–633
See application file for complete search history.

(56) References Cited

U.S. PATENT DOCUMENTS

| 5,977,935 | A | * | 11/1999 | Yasukawa et al. ................. 345/8 |
| 6,012,176 | A | | 1/2000 | Daley, III |
| 6,243,054 | B1 | | 6/2001 | DeLuca |
| 6,417,969 | B1 | | 7/2002 | DeLuca et al. |
| 6,448,944 | B2 | | 9/2002 | Ronzani et al. |
| 6,559,813 | B1 | | 5/2003 | DeLuca et al. |
| 7,119,971 | B2 | | 10/2006 | Kobayashi et al. |
| 8,550,621 | B2 | | 10/2013 | Jannard |
| 8,717,481 | B2 | | 5/2014 | Kamiya |
| 8,767,014 | B2 | | 7/2014 | Vaught et al. |
| 8,810,482 | B2 | | 8/2014 | Abdollahi et al. |
| 8,842,368 | B2 | * | 9/2014 | Simmonds et al. ........... 359/631 |
| 2004/0252077 | A1 | * | 12/2004 | Terasaki ............. G02B 27/0176 345/8 |
| 2005/0237271 | A1 | * | 10/2005 | Yamamoto ........... G02B 27/017 345/8 |
| 2005/0275714 | A1 | | 12/2005 | Ishikawa et al. |
| 2010/0253603 | A1 | * | 10/2010 | Righi et al. ....................... 345/8 |
| 2011/0270522 | A1 | * | 11/2011 | Fink ............................. 701/208 |

(Continued)

FOREIGN PATENT DOCUMENTS

| WO | 98/29775 A1 | 7/1998 |
| WO | 2012132289 A1 | 10/2012 |
| WO | 2014068482 A1 | 5/2014 |

*Primary Examiner* — Stephen Sherman
(74) *Attorney, Agent, or Firm* — Faegre Baker Daniels LLP

(57) ABSTRACT

A head-mountable optical display apparatus includes a visor frame and a first image display device. The visor frame includes an upper band, a lower band, an outer surface, and an inner surface. The upper band is configured to be proximate to a user's head. The lower band is configured to be distal to the user's head. The outer surface and the inner surface extend from the upper band to the lower band. The outer surface is configured to face away from the user's head. The inner surface extends is configured to face toward the user's head. At least a portion of the inner surface is transparent to the user. The first image display device is disposed along the lower band. The first image display device is configured to display optical images within line of sight of the user.

20 Claims, 6 Drawing Sheets

(56) References Cited

U.S. PATENT DOCUMENTS

| | | |
|---|---|---|
| 2012/0062806 A1 | 3/2012 | Sugiyama |
| 2013/0044042 A1 | 2/2013 | Olsson et al. |
| 2013/0100511 A1 | 4/2013 | Yamamoto et al. |
| 2013/0127980 A1* | 5/2013 | Haddick et al. ............ 348/14.08 |
| 2013/0214998 A1* | 8/2013 | Andes et al. ...................... 345/8 |
| 2013/0222213 A1* | 8/2013 | Abdollahi et al. ................ 345/8 |
| 2013/0307856 A1 | 11/2013 | Keane et al. |
| 2014/0071539 A1 | 3/2014 | Gao |
| 2014/0098009 A1 | 4/2014 | Prest et al. |
| 2014/0104692 A1 | 4/2014 | Bickerstaff et al. |
| 2014/0161287 A1 | 6/2014 | Liu et al. |

\* cited by examiner

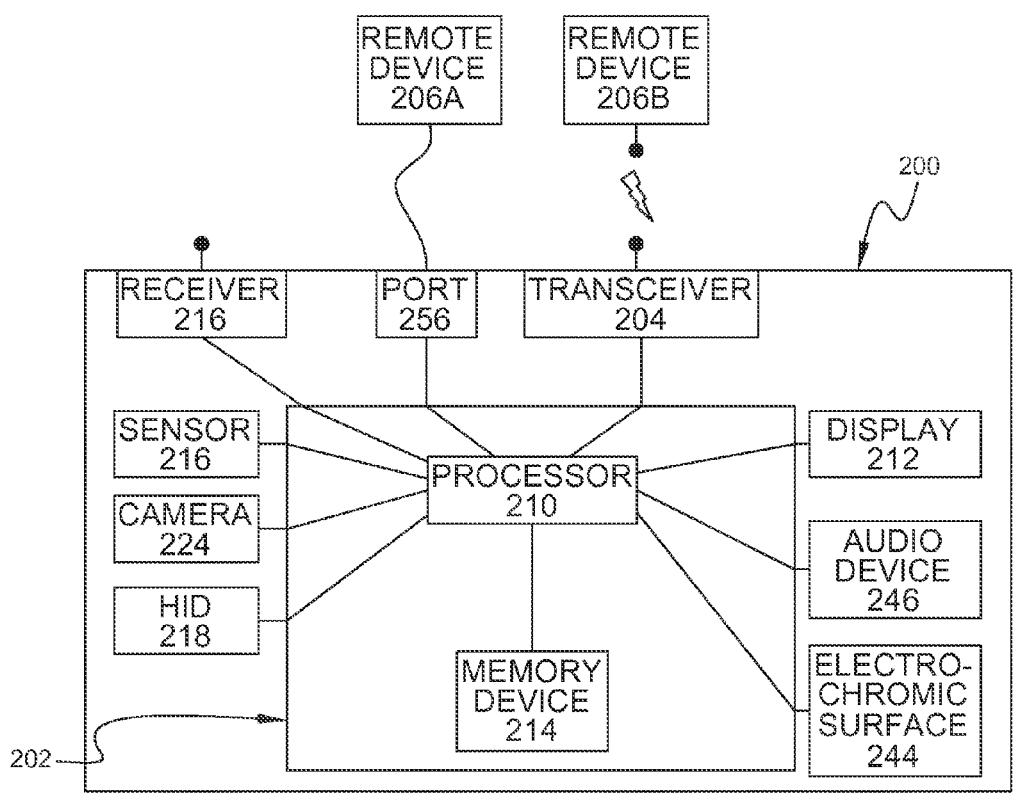

WEARABLE OPTICAL DISPLAY WITH AUDIO FUNCTIONALITY

CROSS-REFERENCE TO RELATED APPLICATION

This application claims priority to U.S. Provisional Application No. 62/034,789, entitled "WEARABLE OPTICAL DISPLAY WITH AUDIO FUNCTIONALITY", filed Aug. 8, 2014, which is herein incorporated by reference in its entirety.

TECHNICAL FIELD

The present invention relates to personal display devices. More specifically, the invention relates to a head-mountable optical display apparatus.

BACKGROUND

Head-mounted optical display devices allow a wearer, or user, to have a hands-free viewing experience of their personal media from a remote device, such as a laptop or netbook computer, a smartphone, or a tablet computer. Personal media may include, for example, e-mail messages, text messages, appointment reminders, photographs, maps, images, videos, video game images, and any web pages selected by the user. Some head-mounted display devices, such as goggle-type frames, may completely obscure a user's vision, except for images displayed by the device. Such devices visually isolate the user from their environment to provide an immersive experience. Other head-mounted display devices may attach to eyeglass frames and project transparent images onto a surface in the line of sight of the user. Such devices provide no visual isolation of the user from their environment and are unable to provide any type of immersive experience.

SUMMARY

In Example 1, a head-mountable optical display apparatus includes a visor frame and a first image display device. The visor frame includes an upper band, a lower band, an outer surface, and an inner surface. The upper band is configured to be proximate to a user's head. The lower band is configured to be distal to the user's head. The outer surface and the inner surface extend from the upper band to the lower band. The outer surface is configured to face away from the user's head. The inner surface extends is configured to face toward the user's head. At least a portion of the inner surface is transparent to the user. The first image display device is disposed along the lower band. The first image display device is configured to display optical images within line of sight of the user.

In Example 2, the apparatus of Example 1, wherein the degree of transparency of the transparent portion of the inner surface is adjustable between fully transparent to the user and partially transparent to the user.

In Example 3, the apparatus of any of Examples 1-2, wherein the first image display device includes at least one of a liquid crystal display device, a light-emitting diode display device, an organic light-emitting diode display device, and an electroluminescent display device.

In Example 4, the apparatus of any of Examples 1-3, wherein the apparatus is configured to rest against a user's forehead and sides of the head to at least above a user's ears, the apparatus further including two side arms connected to the upper band and the lower band. Each of the two side arms rests against a side of the user's head and is configured to extend to at least above the ears. The upper band is configured such that at least a portion rests against the user's forehead such that the two side arms and the upper band are configured to secure the apparatus to the user's head.

In Example 5, the apparatus of any of Examples 1-4, further including at least one audio output device disposed in one of the two side arms, wherein the at least one audio output device is at least one of an audio speaker, a bone conduction transducer, and an audio jack for use with an earpiece.

In Example 6, the apparatus of any of Examples 1-5, further including a human input device, an external electronic communication means, and an on-board computing system. The human input device is disposed along at least one of the upper band, the lower band, and the two side arms. The on-board computing system is disposed within at least one of the upper band, the lower band, and the two side arms. The on-board computing system includes a processor and a memory device. The processor is electrically connected to at least the human input device, the external electronic communication means, and the first image display device. The memory device is electrically connected to the processor. The memory device storing at least one of software and firmware for execution by the processor. The on-board computing system is configured to receive input data from at least one of the human input device and the external electronic communication means, analyze the input data, and generate output data to control images displayed by at least the first image display device.

In Example 7, the apparatus of any of Examples 1-6, wherein the external electronic communication means includes at least one of a wired serial data and power communication device, and a wireless communication device.

In Example 8, the apparatus of any of Examples 1-7, further including a second image display device. The second image display device includes at least one video projector disposed along at least one of the upper band, the lower band, and the two side arms. The at least one video projector is configured to project an image onto the inner surface.

In Example 9, the apparatus of Example 8, further including at least one of a forward facing video camera, a rearward facing video camera, and a downward facing video camera. The forward facing video camera is disposed along at least one of the upper band and the lower band. The forward facing video camera is configured to capture images in a direction ahead of the user. The rearward facing video camera is disposed along one of the two side arms. The rearward facing video camera is configured to capture images in a direction behind the user. The downward facing video camera is disposed along at least one of the upper band and the lower band. The downward facing video camera is configured to capture images in a downward direction with respect to the direction of the line of sight of the user. The images captured by at least one of the forward facing video camera, the rearward facing video camera, and the downward facing video camera are projectable onto the inner surface by the at least one video projector.

In Example 10, the apparatus of Example 9, wherein the images captured by at least one of the forward facing video camera, the rearward facing video camera, and the downward facing video camera are projectable onto the inner surface by the at least one video projector as magnified images.

In Example 11, the apparatus of any of Examples 9-10, including the downward facing video camera, in which the apparatus further includes a downward facing keyboard projector disposed along at least one of the upper band and the lower band. The keyboard projector is configured to project a keyboard image in a downward direction with respect to the direction of the line of sight of the user. Images captured by the downward facing video camera, including typing and input motions, are interpreted by the apparatus as input data.

In Example 12, the apparatus of any of Examples 1-11, further including a facial video camera disposed along the lower band, wherein the facial video camera is configured to capture images of the user's face.

In Example 13, the apparatus of Example 12, wherein the images captured by the facial video camera are interpreted by the apparatus as input data.

In Example 14, a head-mountable optical display apparatus includes a visor frame, a first image display device, and a second image display device. The visor frame includes an upper band, a lower band, an outer surface, and an inner surface. The upper band is configured to be proximate to a user's head. The lower band is configured to be distal to the user's head. The outer surface and the inner surface extend from the upper band to the lower band. The outer surface is configured to face away from the user's head. The inner surface extends is configured to face toward the user's head. At least a portion of the inner surface is transparent to the user. The first image display device is configured to provide a first optical display to the user. The first image display device disposed on the lower band such that it aligns with a line of sight of the user. The second image display device is configured to provide a second optical display to the user. The second image display device includes at least one video projector disposed along at least one of the upper band and the lower band. The at least one video projector is configured to project the second optical display onto the inner surface.

In Example 15, the apparatus of Example 14, wherein the degree of transparency of the transparent portion of the inner surface is adjustable between fully transparent to the user and partially transparent to the user.

In Example 16, the apparatus of any of Examples 14-15, wherein the first image display device includes at least one of a liquid crystal display device, a light-emitting diode display device, an organic light-emitting diode display device, and an electroluminescent display device.

In Example 17, the apparatus of any of Examples 14-16, wherein the apparatus is configured to rest against a user's forehead and sides of the head to at least above a user's ears, the apparatus further including two side arms connected to the upper band and the lower band. Each of the two side arms rests against a side of the user's head and is configured to extend to at least above the ears. The upper band is configured such that at least a portion rests against the user's forehead such that the two side arms and the upper band are configured to secure the apparatus to the user's head.

In Example 18, the apparatus of any of Examples 14-17, further including at least one of a forward facing video camera, a rearward facing video camera, and a downward facing video camera. The forward facing video camera is disposed along at least one of the upper band and the lower band. The forward facing video camera is configured to capture images in a direction ahead of the user. The rearward facing video camera is disposed along one of the two side arms. The rearward facing video camera is configured to capture images in a direction behind the user. The downward facing video camera is disposed along at least one of the upper band and the lower band. The downward facing video camera is configured to capture images in a downward direction with respect to the direction of the line of sight of the user. The images captured by at least one of the forward facing video camera, the rearward facing video camera, and the downward facing video camera are projectable onto the inner surface by the at least one video projector.

In Example 19, the apparatus of any of Examples 14-18, further including a human input device, an external electronic communication means, and an on-board computing system. The human input device is disposed along at least one of the upper band, the lower band, and the two side arms. The on-board computing system is disposed within at least one of the upper band, the lower band, and the two side arms. The on-board computing system includes a processor and a memory device. The processor is electrically connected to at least the human input device, the external electronic communication means, the first image display device, the second image display device, and at least one of the forward facing video camera, the rearward facing video camera, and the downward facing video camera. The memory device is electrically connected to the processor. The memory device storing at least one of software and firmware for execution by the processor. The on-board computing system is configured to receive input data from at least one of the human input device, the external electronic communication means, and at least one of the forward facing video camera, the rearward facing video camera, and the downward facing video camera; analyze the input data and generate output data to control images displayed by at least one of the first image display device and the second image display device.

In Example 20, the apparatus of any of Examples 18-19, wherein the images captured by at least one of the forward facing video camera, the rearward facing video camera, and the downward facing video camera are projectable onto the inner surface by the at least one video projector as magnified images.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

FIG. 8 is a schematic block diagram of an embodiment of a head-mountable optical display apparatus.

DETAILED DESCRIPTION

A more complete understanding of the present invention is available by reference to the following detailed description of numerous aspects and embodiments of the invention. The detailed description of the invention which follows is intended to illustrate, but not limit, the invention.

A head-mountable optical display apparatus embodiment may be connectable to a remote device, such as a laptop or netbook computer, a smartphone, or a tablet computer to display personal media from the remote device and provide a user with an experience that is both immersive and non-isolating. Embodiments may be adjustable to vary the extent to which the experience is immersive and the extent to which the experience is non-isolating.

Figure 1:
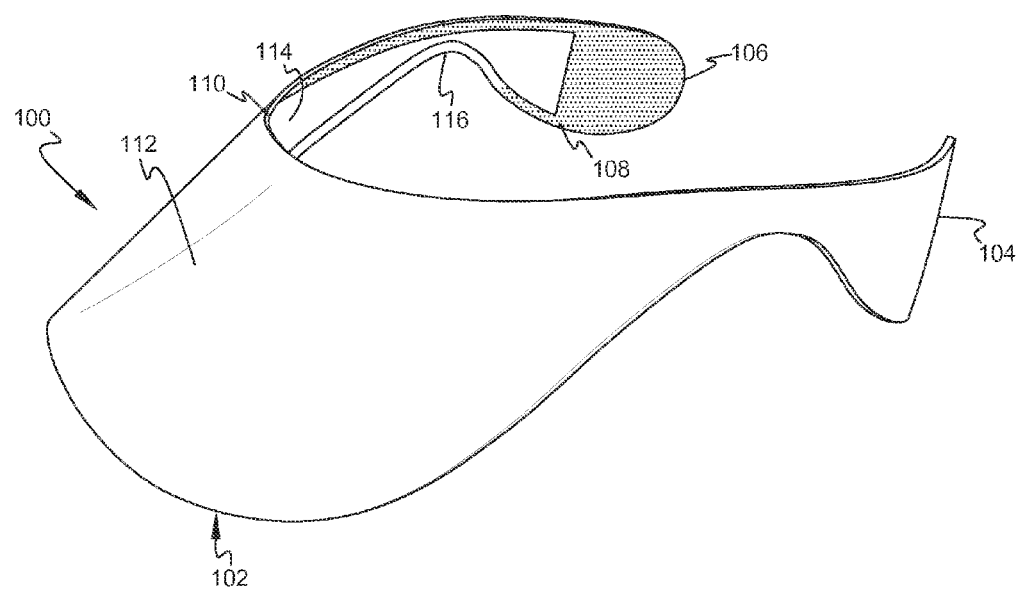
FIG. 1 shows a side perspective view of an embodiment of a head-mountable optical display apparatus.

FIG. 1 is a perspective side view of an embodiment of an exemplary head-mountable optical display apparatus. As shown in FIG. 1, a display apparatus 100 may include a visor frame 102. The visor frame 102 may include an upper band 110, a lower band 116, an outer surface 112, and an inner surface 114. As shown in the embodiment of FIG. 1, the display apparatus 100 may further include a left side arm 104, a right side arm 106, and a foam layer 108. The upper band 110 may be a curved along at least a portion of its length and may be configured such that it may be proximate to a user's head when in use. The lower band 116 may be configured such that at least a portion of its length may be distal to the user's head.

Figure 2:
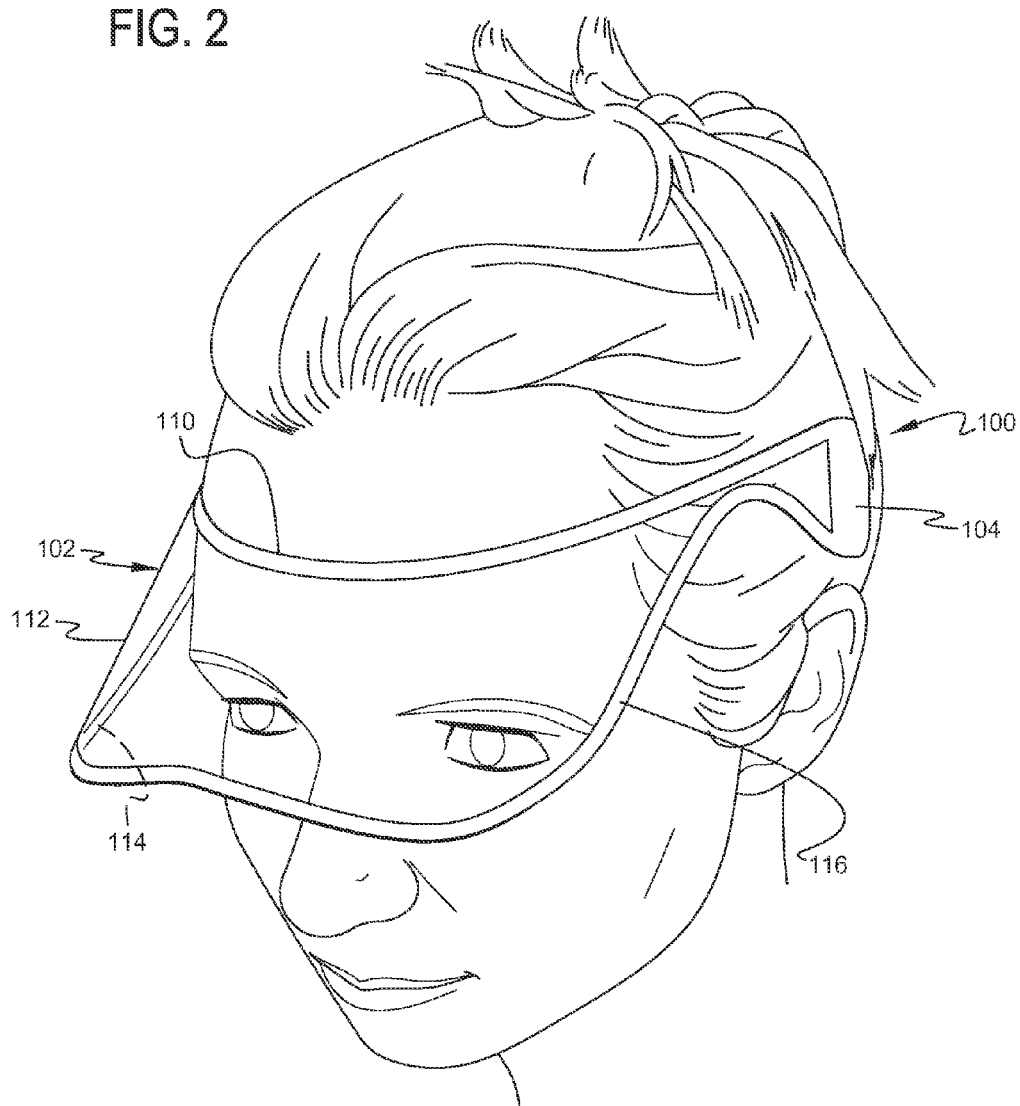
FIG. 2 shows a front perspective view of the embodiment of FIG. 1 as may be worn by a user.

FIG. 2 shows a front perspective view of the embodiment of FIG. 1 as it may be worn by a user. Considering FIGS. 1 and 2 together, they show that the outer surface 112 extends from the upper band 110 to the lower band 116 and may be configured such that it faces generally away from the user's head. The inner surface 114 extends from the upper band 110 to the lower band 116 and may be configured such that it faces generally toward the user's head. In some embodiments, the left side arm 104 may be connected to the upper band 110 and the lower band 116 on one side of the visor frame 102, and the right side arm 106 may be connected to the upper band 110 and the lower band 116 on the other side of the visor frame 102.

As shown in FIG. 2, the display apparatus 100 may be configured so that in use the upper band 110 rests against a user's forehead and each of the left side arm 104 and the right side arm 106 rests against a side of the user's head and extends to at least above the user's ears. In some embodiments, the foam layer 108 may be disposed along at least a portion of the upper band 110 and configured such that it may be between the portion of the upper band 110 and the user's head. In other embodiments, the foam layer 108 may be further disposed along at least a portion of the left side arm 104 and/or the right side arm 106, and/or along a portion of the lower band 116, as shown in FIG. 1. In some embodiments, the foam layer 108 may enhance the comfort and fit of the display apparatus 100 to a user's head.

The upper band 110, the lower band 116, the left side arm 104, and the right side arm 106 may be formed of plastic, metal, or other materials, or a combination of these materials. In some embodiments, a portion of the left side arm 104 and the right side arm 106 may be made of an elastic or fabric material and extend around the user's head until they meet, such that the display apparatus 100 encircles the user's head. The foam layer 108 may be made of any elastic material suitable for use against human skin, and may include perforations and/or hollow cells.

The outer surface 112 and the inner surface 114 may be made of a material that is transparent, or may be made to be transparent, in at least one direction. In some embodiments, the transparency of the outer surface 112 and the inner surface 114 may be adjustable between fully transparent and partially transparent, at least when viewed in a direction from the inner surface 114 toward the outer surface 112. In other embodiments, the transparency of the outer surface 112 and the inner surface 114 the may be adjustable between opaque as shown in FIG. 1, and fully transparent as shown in FIG. 2. In some embodiments, the transparency of the outer surface 112 and/or the inner surface 114 may by electrically adjustable. For example, in some embodiments, at least one of the outer surface 112 and the inner surface 114 may include electrochromic materials such that by changing a voltage applied to the electrochromic materials, the transparency of at least one of the outer surface 112 and the inner surface 114 may be changed. In some embodiments, the outer surface 112 and/or the inner surface 114 may include a reflective finish treatment to partially or completely reflect light. The transparency provided by the outer surface 112 and/or the inner surface 114 allows for a non-isolating experience. That is, the display apparatus 100 allows a user to view the ambient real-world through at least a portion of the visor frame 102. In some embodiments, the display apparatus 100 may be configured to appear to passersby as an aesthetically pleasing silvered or partially transparent sun visor.

Figure 3:
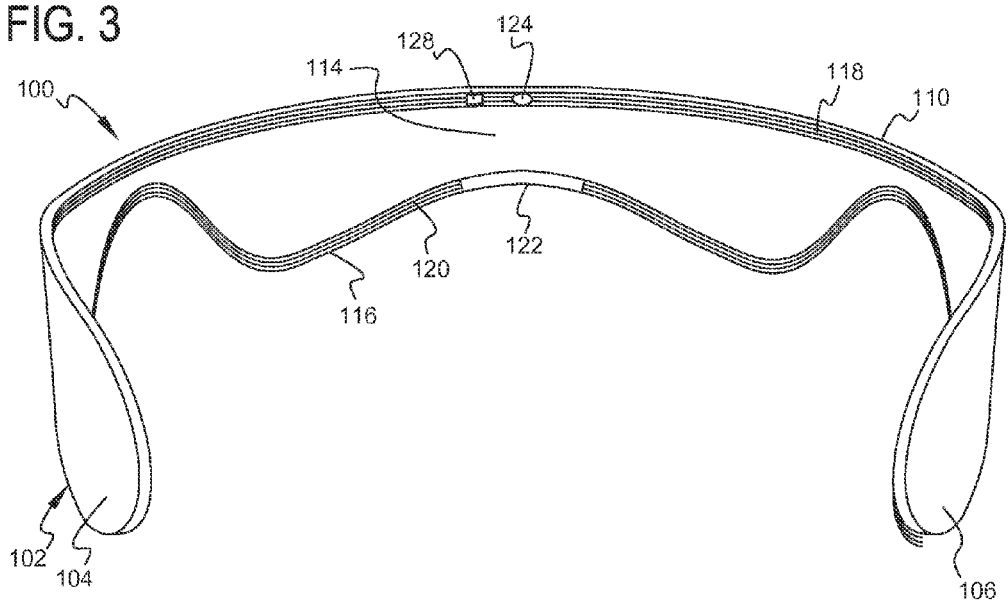
FIG. 3 shows a rear inner view of the embodiment of FIG. 1

FIG. 3 shows a rear inner view of the embodiment of FIG. 1. FIG. 3 is shown without foam layer 108 for clarity. FIG. 3 shows that the display apparatus 100 may further include an upper groove 118, a lower groove 120, a first image display device 122, a forward-facing video camera 124, and a sensor 128. The upper groove 118 may be a channel extending along at least a portion of the upper band 110. The lower groove 120 may be a channel extending along at least a portion of the lower band 116. The first image display device 122 may be any type of electronic display device, for example: a liquid-crystal display (LCD) device; a light-emitting diode (LED) display device such as an inorganic LED, an organic LED (OLED), a passive-matrix OLED (PMOLED), or an active-matrix OLED (AMOLED); or an electroluminescent display device. The forward-facing video camera 124 may be any type of electronic video capture device, for example, a camera having a charge-coupled device (CCD) image sensor, or camera having a complementary metal oxide semiconductor (CMOS) image sensor. The forward-facing video camera 124 may be configured to capture images in a direction forward of the user. The sensor 128 may be any type of sensor or combination of sensors. For example, the sensor 128 may include an infrared sensor configured to measure body temperature, an accelerometer to measure movements of the user, an optical sensor configured to monitor heart rate, or a gyroscope to measure position of the user, or any combination of these sensors.

The first image display device 122 may be disposed along the lower band 116 and is configured to display optical images within line of sight of the user. In some embodiments, within line of sight of the user means a vertical position within 30 degrees of horizontal. In other embodiments, within line of sight of the user means a vertical position within 20 degrees of horizontal. In still other embodiments, within line of sight of the user means a vertical position within 10 degrees of the horizontal. The first image display device 122 is illustrated FIG. 3 as a single display disposed in a central location along the lower band 116. However, it is understood that the first image display device 122 may include multiple displays and/or may be disposed along the lower band 116 to the left or right of the central location. In some embodiments, the first image display device 122 may be disposed along the lower band 116 within 45 degrees to the left or right of the central location. In other embodiments, the first image display device 122 may be disposed along the lower band 116 within 30 degrees to the left or right of the central location.

The first image display device 122 may be attached to lower band 116 by adhesive, or by a mechanical coupling with the lower groove 120, such as by press-fitting, a fastener, or an interlocking or snap fit connection. Electrical connections for the first image display device 122 may be provided by wiring (not shown) running at least partially within the lower groove 120. The first image display device 122 may be formed to any curvature of the lower band 116. In some embodiments, a portion of the first image display device 122 may extend vertically downward from the lower band 116 such that the first image display device 122 may provide a viewing area larger than a vertical width of the lower band 116.

The forward-facing video camera 124 and the sensor 128 may also be attached to upper band 118 by adhesive, or by a mechanical coupling with the upper groove 118. Electrical connections for the forward-facing video camera 124 and the sensor 128 may be provided by wiring (not shown) running at least partially within the upper groove 118. In some embodiments, the foam layer 108 (FIG. 1) may also be attached to at least a part of the upper band 118 and, optionally, a portion of the lower band 116 by adhesive, or by a mechanical coupling with the upper groove 118 and lower groove 120, such as by press-fitting, a fastener, or an interlocking or snap fit connection. In some embodiments, the foam layer 108 may cover at least a portion of the wiring within the upper groove 118 and/or the lower groove 120. In other embodiments, a detachable panel (not shown) may cover at least a portion of the wiring within the upper groove 118 and/or the lower groove 120. Voids in either of the foam layer 108 or the detachable panel may be provided for the proper functioning of components such as the display 122 and the sensor 128.

In operation, personal media from a remote device connected to the display apparatus 100, such as a laptop or netbook computer, a smartphone, or a tablet computer may be displayed by the first image display 122. The transparency provided by the outer surface 112 and/or the inner surface 114 allows for a non-isolating experience. That is, the display apparatus 100 allows a user to view the ambient real-world through at least a portion of the visor frame 102 while viewing the personal media. By adjusting the transparency of the outer surface 112 and/or the inner surface 114 between fully transparent and partially transparent, at least when viewed in a direction from the inner surface 114 toward the outer surface 112, the degree to which the experience is non-isolating may be varied. In some embodiments, information collecting by the sensor 128 may be displayed on the first image display device 122. In some embodiments, images from the forward-facing video camera 124 may be displayed on the first image display device 122. The images displayed from the forward-facing video camera 124 may be modified to provide for enhanced viewing of the user's surroundings. For example, the image displayed on the first image display device 122 from the forward-facing video camera 124 may represent a magnification of the forward view. In another example, the image displayed may represent a wide-angle of the forward view.

Figure 4:
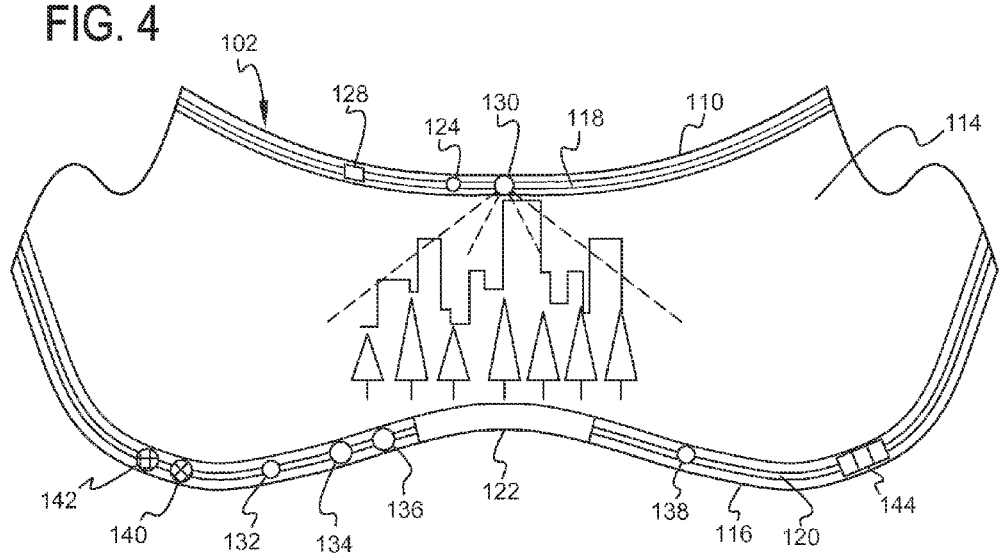
FIG. 4 shows a view of embodiment of FIG. 1 as viewable by a user.

FIG. 4 shows a view of embodiment of FIG. 1 as viewable by a user wearing the display apparatus 100, and illustrating additional features. As shown in FIG. 4, the display apparatus 100 may further include any or all of: an upper band video projector 130, a downward-facing video camera 132, a downward-facing projector 134, a lower band video projector 136, a facial video camera 138, a microphone 140, an audio speaker 142, and a touch-based input 144. The upper band video projector 130 is a second image display device disposed along the upper band 110. The upper band video projector 130 may be attached to upper band 118 by adhesive, or by a mechanical coupling with the upper groove 118. Electrical connections for the upper band video projector 130 may be provided by wiring (not shown) running at least partially within the upper groove 118. As shown in FIG. 4, the upper band video projector 130 may be configured to project images onto the inner surface 114 such that they are visible to the user as the second image display device. The inner surface 114 may include a finish or coating that enhances the clarity of the projected image as perceived by the user. Additionally or alternatively, in some embodiments the second image display device may include the lower band video projector 136 disposed along the lower band 116. The lower band video projector 136 may be attached to lower band 116 by adhesive, or by a mechanical coupling with the lower groove 120. Electrical connections for the lower band video projector 136 may be provided by wiring (not shown) running at least partially within the lower groove 120. As with the upper band video projector 130, the lower band video projector 136 may be configured to project images onto the inner surface 114 such that they are visible to the user as the second image display device.

In some embodiments, the separate video projectors 130 and 136 as the second image display device may project images onto different locations of the inner surface 114. In some embodiments, the second image display device may project images from the forward-facing video camera 124 onto inner surface 114. The images projected from the forward-facing video camera 124 may be modified to provide for enhanced viewing of the user's surroundings. For example, the image projected may represent a magnification of the forward view or a wide-angle of the forward view. Additionally or alternatively, either or both of the upper band video projector 130 and the lower band video projector 136 may be configured to project text and images onto the inner surface 114 in an reverse format such that the text and images may be visible to bystanders to provide communication by the user in a non-verbal format.

The downward-facing video camera 132 may be similar to forward-facing video camera 124, but facing downward. The downward-facing projector 134 may be a projector similar to the upper band video projector 130, but configured to project an image onto a surface below the downward-facing video camera 132. The downward-facing video camera 132 and the downward-facing projector 134 may be attached to lower band 116 by adhesive, or by a mechanical coupling with the lower groove 120. Electrical connections for the downward-facing video camera 132 and the downward-facing projector 134 may be provided by wiring (not shown) running at least partially within the lower groove 120. In use, the downward-facing keyboard projector 134 projects a pattern, for example, a QWERTY keyboard pattern, onto the surface below the downward-facing video camera 132. A user may type on the projected keyboard with the keystrokes imaged by the downward-facing video camera 132 as inputs to the display apparatus 100. Alternatively or additionally, images from the downward-facing video camera 132 may be displayed on the first image display device 122 so that, for example, the user may observe the projected keyboard while typing, or observe the ground ahead of the user. In some embodiments, images from the downward-facing video camera 132 may be displayed onto the inner surface 114 as the second image display device as described above. The images projected from the downward-facing video camera 132 may be modified, for example, the images projected may represent a magnification of the downward view or a wide-angle of the downward view.

The facial video camera 138 may be similar to forward-facing video camera 124, but facing toward the user's face. The facial video camera 138 may be attached to lower band 116 by adhesive, or by a mechanical coupling with the lower groove 120. Electrical connections for the facial video camera 138 may be provided by wiring (not shown) running at least partially within the lower groove 120. In use, the facial video camera 138 may record facial images for video communication applications. Alternatively or additionally, the facial video camera 138 may detect specific facial movements, such as an eye blink or pattern of eye blinks, as inputs to the display apparatus 100. Alternatively or additionally, the facial video camera 138 may detect specific iris patterns of the user's eye or eyes as inputs to the display apparatus 100 for, for example, identification of the user.

The microphone 140, the audio speaker 142, and the touch-based input 144 may be attached to lower band 116 by adhesive, or by a mechanical coupling with the lower groove 120. Electrical connections for the microphone 140, the audio speaker 142, and the touch-based input 144 may be provided by wiring (not shown) running at least partially within the lower groove 120. The microphone 140 may allow the user to record sound during video recording, to provide the user's voice during telephone conversations, and to allow the user to provide voice commands as inputs to the display apparatus 100. The audio speaker 142 may broadcast synthesized speech as directed by the user. While one microphone 140 and one audio speaker 142 each are shown in FIG. 4, it is understood that the microphone 140 and the audio speaker 142 may include multiple individual microphones or speakers, respectively, located anywhere on the lower band 116.

The touch-based input 144 may be, for example, a touch pad or a keypad. The touch-based input 144 may employ capacitive sensing, resistance sensing, or surface acoustic wave sensing to sense pressure applied by a finger or movement of the finger relative to the surface of the touch-based input 144. Additionally or alternatively, the touch-based input 144 may be in the form of a button, dial, wheel, or scroll bar. The touch-based input 144 may include a surface or edges that have physical features to assist the user in positioning the user's finger on the surface. In some embodiments, the touch-based input 144 may be located within sight of the user as shown in FIG. 4. The touch-based input 144 may allow the user to input commands to the display apparatus 100. Although a single touch-based input 144 is shown in FIG. 4, it is understood that display apparatus 100 may include additional touch-based inputs 144.

Figure 5:
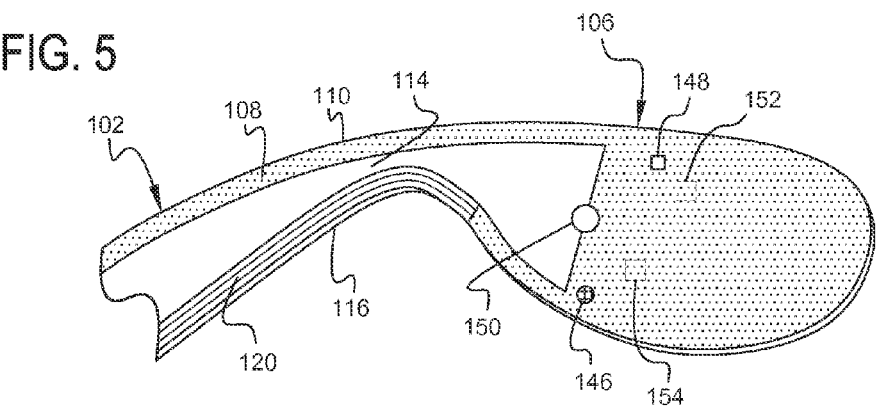
FIG. 5 shows an inner view of a side of a portion of the embodiment of FIG. 1

FIG. 5 shows a partial inner view of a side of a portion of the embodiment of FIG. 1. FIG. 5 shows the right side arm 106, however it is understood that any feature described herein with respect to either of the left side arm 104 or the right side arm 106 may be present in the other side arm either in the alternative, or in addition. As shown in FIG. 5, the right side arm 106 may include an audio output device 146, a sensor 148, a side arm video projector 150, an on-board computing system 152, and an energy storage device 154. The audio output device 146 may be at least one of an audio speaker and a bone conduction transducer. The sensor 148 may be any type of sensor or combination of sensors as described above in reference to FIG. 3. For example, the sensor 148 may include an infrared sensor or a resistive sensor configured to measure body temperature, an accelerometer to measure movements of the user, an optical sensor or a transducer configured to monitor heart rate, or a gyroscope to measure position of the user, or any combination of the above. The side arm video projector 150 is a second image display device and may be configured to project images onto the inner surface 114 such that they are visible to the user as the second image display device. In some embodiments, the side arm video projector 150 may be used in conjunction with, or independently of, the upper band video projector 130 and the lower band video projector 136. In some embodiments, the side arm video projector 150 (or projectors 150, if in both side arms 104 and 106) may be the only second image display device. Additionally or alternatively, either or both of the upper band video projector 130, the lower band video projector 136, and the side arm video projector 150 may be configured to project text and images onto the inner surface 114 in an reverse format such that they are visible to bystanders in a non-verbal format.

The on-board computing system 152 may be located within the right side arm 106. The on-board computing system 152 may receive input data, analyze input data, and generate output data, as described in detail below in reference to the embodiment of FIG. 8. The on-board computing system 152 may be in the form of a monolithic integrated circuit, or a combination of discrete electrical components.

The energy storage device 154 may be any type of device for storing electrical energy, such as a disposable chemical battery, a rechargeable chemical battery, a fuel cell, or a high-capacity capacitor, or any combination or multiple of these. The energy storage device 154 is shown in FIG. 5 as contained within the right side arm 106. However, the energy storage device 154 may be of any shape and configuration and may be distributed to various locations within the right side arm 106, the left side arm 104, the upper band 110, and the lower band 116. The energy storage device 154 may provide at least a portion of the electrical power necessary to operate the display apparatus 100.

Figure 6:
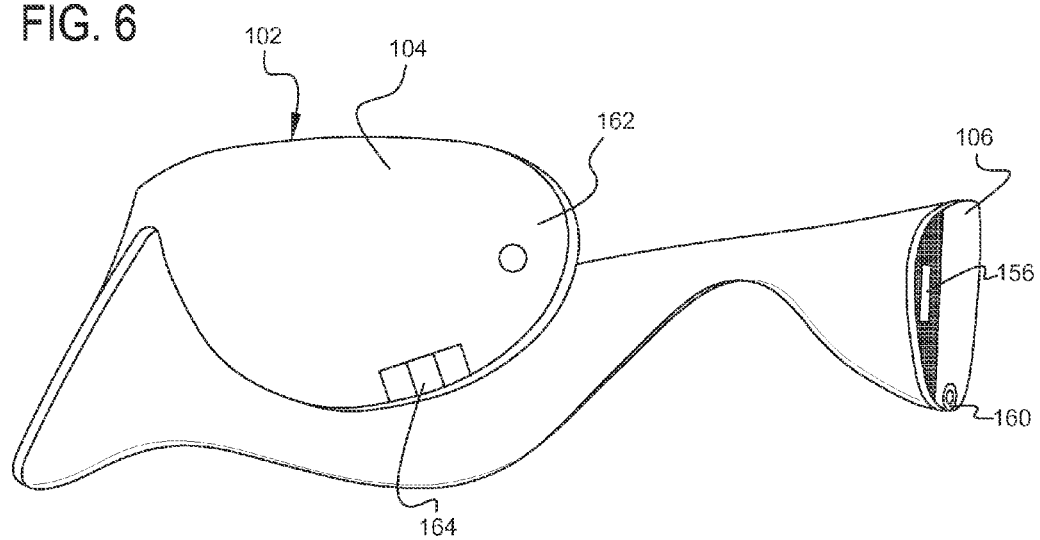
FIG. 6 shows a rear perspective view of the embodiment of FIG. 1.

FIG. 6 shows a rear perspective view of the embodiment of FIG. 1. As with FIG. 5 describe above, it is understood that any feature described herein with respect to either of the left side arm 104 or the right side arm 106 may be present in the other side arm either in the alternative, or in addition. As shown in FIG. 6, the right side arm 106 may further include a port 156 and an audio jack 160, and the left side arm 104 may further include a rearward-facing video camera 162 and a touch-based input 164. The port 156 may be an electrical connection to convey data, power, or both. In some embodiments, the port 156 may be a Universal Serial Bus (USB) communication device for external communication with a remote device, such as a laptop or netbook computer, a smartphone, or a tablet computer. The audio jack 160 may be an electrical connection configured for use with an ear piece to fit in a user's ear as an audio output device as an alternative to the audio output device 146. In some embodiments, the audio jack 160 may be a 3.5 millimeter audio jack, or audio jack socket.

The reward-facing video camera 162 may be similar to forward-facing video camera 124 described above, but facing in a rearward direction. The rearward-facing video camera 162 may be configured to capture images in a direction rearward of the user. In some embodiments, images from the rearward-facing video camera 162 may be displayed on the first image display device 122 to provide enhanced safety and situational awareness for the user. In some embodiments, images from the rearward-facing video camera 162 may be displayed on the inner surface 114 as the second image display device as described above. The images projected from the rearward-facing video camera 162 may be modified, for example, the images projected may represent a magnification of the rearward view or a wide-angle of the rearward view.

The touch-based input 164 may be, for example, a touch pad or a keypad. The touch-based input 164 may employ capacitive sensing, resistance sensing, or surface acoustic wave sensing to sense pressure applied by a finger or movement of the finger relative to the surface of the touch-based input 164. Additionally or alternatively, the touch-based input 164 may be in the form of a button, dial, wheel, or scroll bar. The touch-based input 164 may include a surface or edges that have physical features to assist the user in positioning the user's finger on the surface. The touch-based input 164 may allow the user to input commands to the display apparatus 100. Although one touch-based input 164 is shown in FIG. 6, it is understood that display apparatus 100 may include additional touch-based inputs 164 on the left arm 104 (or the right arm 106) and that the additional touch-based inputs 164 may provide different inputs to the display apparatus 100 and may operate independently of each other and of the touch-based input 144.

Figure 7:
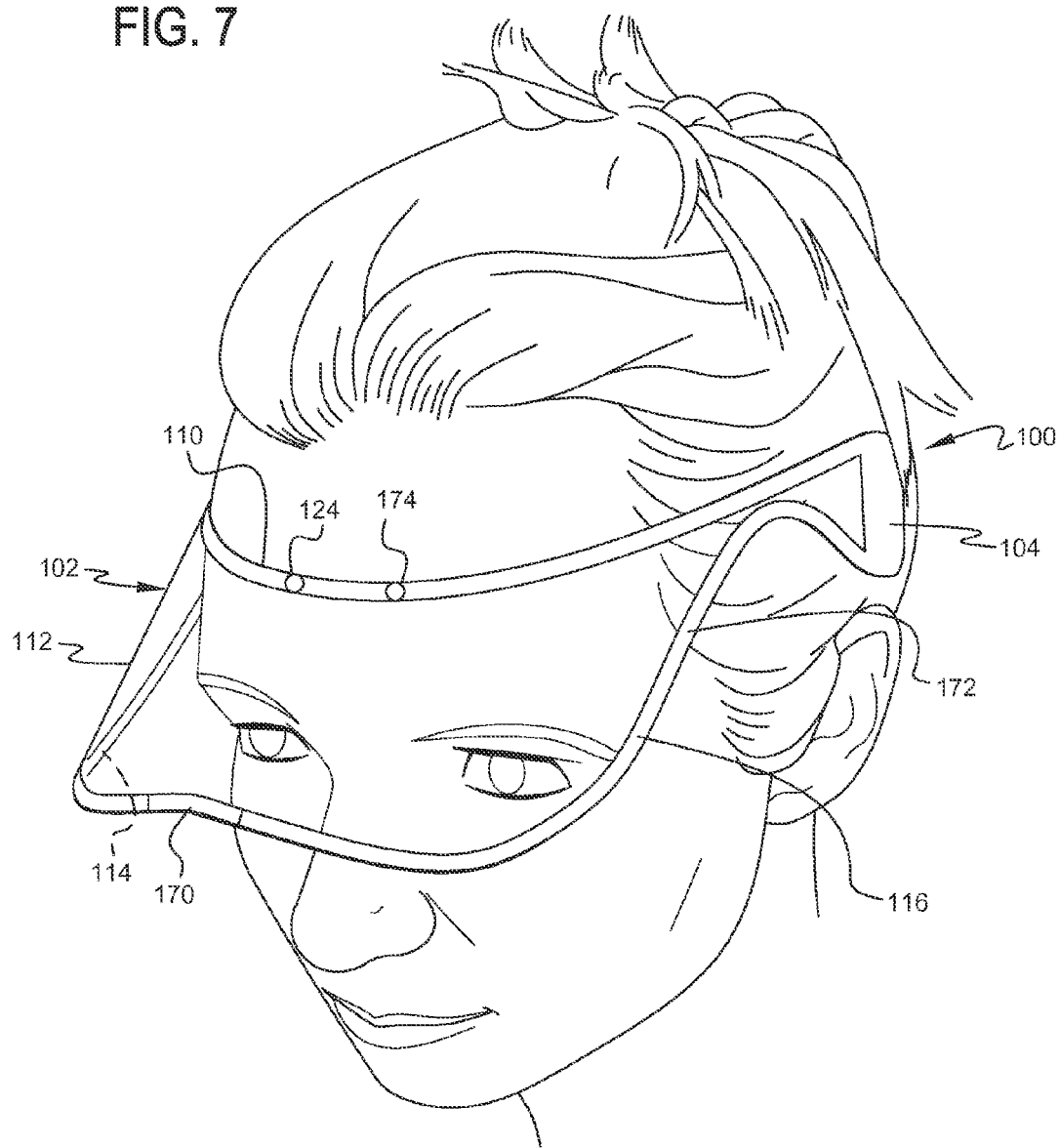
FIG. 7 shows a front perspective view of the embodiment of FIG. 1 including additional optional features.

FIG. 7 shows a front perspective of the display apparatus 100 including additional optional features. As shown in FIG. 7, the display apparatus 100 may optionally further include an external image display device 170, a photovoltaic device 172, and a light source 174. The embodiment shown in FIG. 7 also shows how the forward-facing video camera 124 might be visible in some embodiments where the outer-surface 112 is not silvered or heavily-tinted. The external image display 170 may be any type of electronic display device, for example: a liquid-crystal display (LCD) device; a light-emitting diode (LED) display device such as an inorganic LED, an organic LED (OLED), a passive-matrix OLED (PMOLED), or an active-matrix OLED (AMOLED); or an electroluminescent display device. The external image display device 170 may be attached to an exterior of the visor frame 102, for example, to the lower band 116 as shown in FIG. 7, or to the upper band 110. The external image display device 170 may be formed to any curvature of the lower band 116 or the upper band 110. The external image display device 170 may be configured to display text and images to permit the user to communicate to bystanders in a non-verbal format.

The photovoltaic device 172 may be any type of device for generating electricity from incident rays of light. The photovoltaic device 172 may be disposed on the exterior of the display apparatus 100 along the lower band 116 as shown in FIG. 7, or alternatively or additionally along the upper band 110, the left side arm 104, and the right side arm 106. Energy generated by the photovoltaic device 172 may be supplied to the energy storage device 154 to aid in providing power to the display apparatus 100.

The light source 174 may be any device that emits light in response to an applied electric current, for example, a light-emitting diode. The light source 174 may be activated by the user to aid in viewing the surroundings and/or providing a visual indicator to passersby.

FIG. 8 is a schematic block diagram of an embodiment of a head-mountable optical display apparatus. FIG. 8 shows a display apparatus 200, such as the display apparatus 100 shown in FIGS. 1-7, in wired communication with a remote device 206A, and in wireless communication with a wireless remote device 206B. The remote device 206A and the wireless remote device 206B may be any type of a remote device, such as a laptop or netbook computer, a smartphone, or a tablet computer. As shown in FIG. 8, the display apparatus 200 may include an on-board computing system 202, a sensor 222, a camera 224, a human input device (HID) 218, a display 212, an electrochromic surface 244, an audio device 246, a port 256, a transceiver 204, and a receiver 216. The on-board computing system 202 may include a processor 210, and a memory device 214. The on-board computing system 202 may be, for example, the on-board computing system 152 described above in reference to FIG. 5. The sensor 222 may be any of the sensors described above, including the sensor 128 and the sensor 148 described above. The camera 224 may be any of the cameras describe above, including the forward-facing video camera 124, the downward-facing camera 132, the facial video camera 138, and the rearward-facing video camera 162. The HID 218 may be any of the human input devices described above, including the touch-based input 144 and touch-based input 164 described above. The display 212 may be any of the displays described above, including the first image display device 122, the upper band video projector 130, the lower band video projector 136, the side arm video projector 150, and the external image display device 170. The electrochromic surface 244 may be any of the electrochromic surfaces described above, including the outer surface 112 and the inner surface 114. The audio device 246 may be any of the audio output devices described above, including the audio speaker 142, the audio output device 146, and the audio jack 160. The port 256 may be, for example, the port 156 described above in reference to FIG. 6. The transceiver 204 may wirelessly transmit and receive data by employing any of a number of wireless communications protocols known in the art, for example, IEEE 801.11 (Wi-Fi), Bluetooth®, cellular telephone protocols (e.g., GSM, CDMA, UMTS). The receiver 216 may include a frequency tuner and may wirelessly receive data from any of a number of sources including broadcast television signals, broadcast radio signals, and global positioning system signals. The processor 210 may be a microprocessor or any type of processor. The memory device 214 may be any type of memory device, for example, a read-only memory, a random-access memory, a flash memory, a solid-state drive, a hard drive, or any combination of memory devices.

As shown in FIG. 8, the sensor 222, the camera 224, the HID 218, and the receiver 216 are electrically connected to the on-board computing system 202 to provide input data to the processor 210. The display 212 is electrically connected to the on-board computing system 202 to receive output data generated by the processor 210. The electrochromic surface 244 is electrically connected to the on-board computing system 202 to receive an output voltage controlled by the processor 210. The audio device 246 is electrically connected to the processor 210 to receive output data generated by the processor 210. The memory device 214 is electrically connected to the processor 210 to provide stored software, firmware, and media to the processor 210. The memory device 214 may also provide data identifying the user and/or including personalized settings of the display apparatus 200 that are associated with the user. The port 256 is electrically connected to the processor 210 to provide a means of external electronic communications by way of a wired interface to a remote device, such as the remote device 206A. The transceiver 204 electrically connected to the processor 210 to provide a means of external electronic communications by way of a wireless interface to a wireless remote device, such as the wireless remote device 206B.

In operation, the on-board computing system 202 is configured so that the processor 210 may receive input data from at least one of the sensor 222, the camera 224, the HID 218, the receiver 216, the port 256, and the transceiver 204. The processor 210 may analyze the input data by employing the software, firmware, and any previously stored media provided by the memory device 214. The processor 210 may generate output data from the analysis of the input data. The processor 210 may send the output data to any of the display 212, the audio device 246, or the electrochromic surface 244; or to the port 256 for communication to the remote device 206A, or to the transceiver for wireless transmission to the remote device 206B.

Thus, for example, the remote device 206A may be a laptop computer and may transmit input data, such as a video clip, over the wired connection to the port 256. The remote device 206A may also transmit power as the port 256 may convey data, power, or both. The video clip is provided to the processor 210 by the port 256, where the processor 210 analyzes the video clip using the software and firmware from the memory device 214. The processor 210 generates output data from the analysis of the video clip and sends the output data to the display 212. The display 212 displays the video clip for the user wearing the display apparatus 200. As the video clip is being displayed on the display 212, the user may engage the HID 218 to control the video clip, including the direction and speed at which it is displayed. The user may also engage the HID 218 to control the brightness and size of the images displayed on the display 212. The user may also engage the HID 218 in such a way as to direct the processor 210 to change a voltage applied to the electrochromic surface 244 to alter the transparency of the electrochromic surface 244 to create a viewing experience that is more or less isolating.

In another example, the wireless remote device 206B may be a smartphone and may transmit input data, such as a text message, wirelessly to the transceiver 204. The text message is provided to the processor 210 by the transceiver 204, where the processor 210 analyzes the text message using the software and firmware from the memory device 214. The processor 210 generates output data from the analysis of the text message and sends the output data to the display 212. The display 212 displays the text message for the user wearing the display apparatus 200.

In another example, the user wearing the display apparatus 200 may engage the HID 218 in such a way as to generate input data directing the processor 210 to obtain input data from the camera 224, and to display images from the camera 224 on the display 212.

In another example, the user may engage the HID 218 in such a way as to direct the processor 210 to generate instructions for the remote device 206A to control the remote device 206A to provide media to the display apparatus 200, mute ring tones, or perform voice call control.

The display apparatus 200 is shown having a generally digital architecture. However, it is understood that embodiments may further include analog inputs, analog outputs, analog-to-digital converters, and digital-to-analog converters as desired accommodate analog elements and signals.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

The following is claimed:

1. A head-mountable optical display apparatus comprising:
a visor frame including:
an upper band configured to be proximate to a user's head;
a lower band configured to be distal to the user's head;
an outer surface extending from the upper band to the lower band, the outer surface configured to face away from the user's head;
an inner surface extending from the upper band to the lower band, the inner surface configured to face toward the user's head, wherein at least a portion of the inner surface is transparent to the user; and
a first image display device attached to the lower band, the first image display device configured to display optical images within line of sight of the user,
wherein the apparatus is configured to rest against a user's forehead and sides of the head to at least above a user's ears.

2. The apparatus of claim 1, wherein the degree of transparency of the transparent portion of the inner surface is adjustable between fully transparent to the user and partially transparent to the user.

3. The apparatus of claim 1, wherein the first image display device includes at least one of a liquid crystal display device, a light-emitting diode display device, an organic light-emitting diode display device, and an electroluminescent display device.

4. The apparatus of claim 1, the apparatus further comprising:
two side arms connected to the upper band and the lower band, wherein each of the two side arms rests against a side of the user's head and is configured to extend to at least above the ears,
wherein the upper band is configured such that at least a portion rests against the user's forehead such that the two side arms and the upper band are configured to secure the apparatus to the user's head.

5. The apparatus of claim 4, further comprising:
at least one audio output device disposed in one of the two side arms, wherein the at least one audio output device is at least one of an audio speaker, a bone conduction transducer, and an audio jack for use with an earpiece.

6. The apparatus of claim 4, further comprising:
a human input device disposed along at least one of the upper band, the lower band, and the two side arms;
an external electronic communication means; and
an on-board computing system disposed within at least one of the upper band, the lower band, and the two side arms, the on-board computing system including:
a processor electrically connected to at least the human input device, the external electronic communication means, and the first image display device; and
a memory device electrically connected to the processor, the memory device storing at least one of software and firmware for execution by the processor;
wherein the on-board computing system is configured to receive input data from at least one of the human input device and the external electronic communication means, analyze the input data, and generate output data to control images displayed by at least the first image display device.

7. The apparatus of claim 6, wherein the external electronic communication means includes at least one of:
a wired serial data and power communication device; and
a wireless communication device.

8. The apparatus of claim 6, further comprising a second image display device, the second image display device includes at least one video projector disposed along at least one of the upper band, the lower band, and the two side arms; wherein the at least one video projector is configured to project an image onto the inner surface.

9. The apparatus of claim 8, further comprising at least one of:
a forward facing video camera disposed along at least one of the upper band and the lower band, the forward facing video camera configured to capture images in a direction ahead of the user;
a rearward facing video camera disposed along one of the two side arms, the rearward facing video camera configured to capture images in a direction behind the user; and
a downward facing video camera disposed along at least one of the upper band and the lower band, the downward facing video camera configured to capture images in a downward direction with respect to the direction of the line of sight of the user when the user is facing forward, wherein the images captured by at least one of the forward facing video camera, the rearward facing video camera, and the downward facing video camera are projectable onto the inner surface by the at least one video projector.

10. The apparatus of claim 9, wherein the images captured by at least one of the forward facing video camera, the rearward facing video camera, and the downward facing video camera are projectable onto the inner surface by the at least one video projector as magnified images.

11. The apparatus of claim 9, including the downward facing video camera, wherein the apparatus further includes:

a downward facing keyboard projector disposed along at least one of the upper band and the lower band, the keyboard projector configured to project a keyboard image in a downward direction with respect to the direction of the line of sight of the user;

wherein images captured by the downward facing video camera, including typing and input motions, are interpreted by the apparatus as input data.

12. The apparatus of claim 6, further comprising:

a facial video camera disposed along the lower band, wherein the facial video camera is configured to capture images of the user's face.

13. The apparatus of claim 12, wherein the images captured by the facial video camera are interpreted by the apparatus as input data.

14. A head-mountable optical display apparatus comprising:

a visor frame including:

an upper band configured to be proximate to a user's head;

a lower band configured to be distal to the user's head;

an outer surface extending from the upper band to the lower band, the outer surface configured to face away from the user's head;

an inner surface extending from the upper band to the lower band, the inner surface configured to face toward the user's head, wherein at least a portion of the inner surface is transparent to the user;

a first image display device configured to provide a first optical display to the user, the first image display device attached to the lower band such that it aligns with a line of sight of the user; and a second image display device configured to provide a second optical display to the user, the second image display device including at least one video projector disposed along at least one of the upper band and the lower band; wherein the at least one video projector is configured to project the second optical display onto the inner surface, wherein the apparatus is configured to rest against a user's forehead and sides of the head to at least above a user's ears.

15. The apparatus of claim 14, wherein the degree of transparency of the transparent portion of the inner surface is adjustable between fully transparent to the user and partially transparent to the user.

16. The apparatus of claim 14, wherein the first image display device includes at least one of a liquid crystal display device, a light-emitting diode display device, an organic light-emitting diode display device, and an electroluminescent display device.

17. The apparatus of claim 14, the apparatus further comprising:

two side arms connected to the upper band and the lower band, wherein each of the two side arms rests against a side of the user's head and is configured to extend to at least above the ears, wherein in the upper band is configured such that at least a portion rests against the user's forehead such that the two side arms and the upper band are configured to secure the apparatus to the user's head.

18. The apparatus of claim 17, further comprising at least one of:

a forward facing video camera disposed along at least one of the upper band and the lower band, the forward facing video camera configured to capture images in a direction ahead of the user;

a rearward facing video camera disposed along one of the two side arms, the rearward facing video camera configured to capture images in a direction behind the user; and a downward facing video camera disposed along at least one of the upper band and the lower band, the downward facing video camera configured to capture images in a downward direction with respect to the direction of the line of sight of the user when the user is facing forward, wherein the images captured by at least one of the forward facing video camera, the rearward facing video camera, and the downward facing video camera are projectable onto the inner surface by the at least one video projector.

19. The apparatus of claim 18, further comprising:

a human input device disposed along at least one of the upper band, the lower band, and the two side arms;

an external electronic communication means; and an on-board computing system disposed within at least one of the upper band, the lower band, and the two side arms, the on-board computing system including:

a processor electrically connected to at least the human input device, the external electronic communication means, the first image display device, the second image display device, and at least one of the forward facing video camera, the rearward facing video camera, and the downward facing video camera; and a memory device electrically connected to the processor, the memory device storing at least one of software and firmware for execution by the processor;

wherein the processor is configured to receive input data from at least one of the human input device, the external electronic communication means, and at least one of the forward facing video camera, the rearward facing video camera, and the downward facing video camera; analyze the input data; and generate output data to control images displayed by at least one of the first image display device and the second image display device.

20. The apparatus of claim 19, wherein the images captured by at least one of the forward facing video camera, the rearward facing video camera, and the downward facing video camera are projectable onto the inner surface by the at least one video projector as magnified images.

* * * * *